US009871808B2

(12) United States Patent
Tang et al.

(10) Patent No.: US 9,871,808 B2
(45) Date of Patent: Jan. 16, 2018

(54) SYSTEM AND METHOD FOR HANDLING ROGUE DATA PACKETS

(71) Applicant: Nuance Communications, Inc., Burlington, MA (US)

(72) Inventors: Qian-Yu Tang, Milpitas, CA (US); Victor Zeyliger, Redwood City, CA (US)

(73) Assignee: Nuance Communications, Inc., Burlington, MA (US)

( * ) Notice: Subject to any disclaimer, the term of this patent is extended or adjusted under 35 U.S.C. 154(b) by 547 days.

(21) Appl. No.: 14/253,384

(22) Filed: Apr. 15, 2014

(65) Prior Publication Data
US 2015/0295946 A1    Oct. 15, 2015

(51) Int. Cl.
*G06F 21/00*    (2013.01)
*H04L 29/06*    (2006.01)

(52) U.S. Cl.
CPC ...... *H04L 63/1416* (2013.01); *H04L 63/1466* (2013.01); *H04L 65/1006* (2013.01); *H04L 65/1013* (2013.01); *H04L 65/608* (2013.01); *H04L 2463/121* (2013.01)

(58) Field of Classification Search
CPC ............ H04L 63/1416; H04L 65/1013; H04L 63/1466
See application file for complete search history.

(56) References Cited

U.S. PATENT DOCUMENTS

| 7,676,679 | B2 * | 3/2010 | Weis et al. ................... 713/178 |
| 7,764,697 | B2 * | 7/2010 | Rana ................. H04L 29/06027 370/392 |
| 8,169,901 | B1 * | 5/2012 | Scholte ............... H04L 63/1458 370/230.1 |
| 8,339,974 | B1 * | 12/2012 | Dawson et al. .............. 370/252 |
| 8,687,485 | B1 * | 4/2014 | Dondeti ............. H04L 63/0272 370/230 |
| 2006/0056391 | A1 * | 3/2006 | Rana et al. .................... 370/352 |
| 2009/0288162 | A1 * | 11/2009 | Shaffer et al. .................. 726/22 |
| 2015/0100634 | A1 * | 4/2015 | He .......................... H04L 67/10 709/204 |

OTHER PUBLICATIONS

Schulzrinne, H., et al., "RTP: A Transport Protocol for Real-Time Applications," Network Working Group, Request for Comments: 3550, Category: Standards Track, 89 pages (Jul. 2003).

* cited by examiner

*Primary Examiner* — Anthony Brown
*Assistant Examiner* — William Corum, Jr.
(74) *Attorney, Agent, or Firm* — Brian J. Colandreo; Michael T. Abramson; Holland & Knight LLP

(57) ABSTRACT

The present disclosure is directed towards a system and method for handling rogue data packets. The method may include receiving, using one or more processors, a first data packet having header information associated therewith. The method may further include obtaining, from the header information, sequence number, timestamp and synchronization source identifier information. The method may also include detecting one or more rogue data packets, based upon, at least in part, at least one of the sequence number, timestamp and synchronization source identifier information.

17 Claims, 8 Drawing Sheets

| 0 1 2 3 | 4 | 7 8 9 | 1 5 | 16 | 31 |
|---|---|---|---|---|---|
| V=2 P X | CC | M | PT | Sequence number | |
| Timestamp | | | | | |
| Synchronization source (SSRC) identifier | | | | | |
| Contributing source (CSRC) identifier | | | | | |

SYSTEM AND METHOD FOR HANDLING ROGUE DATA PACKETS

TECHNICAL FIELD

This disclosure relates to communications systems and, more particularly, to a system and method for handling rogue RTP packets in Voice over Internet Protocol ("VoIP") applications.

BACKGROUND

Over years in the areas of telephony, data networking, and telecommunications there has been a network shift from analog to digital, wired to wireless, and a continuous migration of some voice calls from conventional time division multiplexing (TDM) networks to packet based internet protocol (IP) networks. Voice over Internet Protocol ("VoIP") uses real-time transport protocol (RTP) to provide end-to-end delivery services for data with real-time characteristics, such as interactive audio and video. Every RTP packet has a fixed length RTP header, following by RTP payload. The basic RTP header has twelve bytes of data. Among others, the RTP header contains payload type, sequence number, time-stamp, and synchronization source (SSRC).

While the increasing of VoIP applications brings new services and lower costs, it also exacerbates the uncertainty of end-to-end voice quality. Voice transmitted over IP networks is suffering from all kinds of impairments such as delay, packet loss, jitter, disorder, etc. In an IP based telephony network, packets may be lost due to network delay, congestion, or errors, thus causing degradation in voice quality. Packet loss concealment (PLC) algorithms are used to recover from lost packets and to improve the impaired quality, where correctly identifying the timing changes in the incoming RTP packets plays an important role.

One of the challenges in the field of VoIP is that more and more services are introduced over years. One example is the interactive voice response (IVR) technology that allows a computer to interact with humans through the use of speech recognition and dual tone multi-frequency (DTMF) tones input via keypad. In telecommunications, IVR allows users to interact with a service provider's host system via a telephone keypad or by speech recognition, so they can service their own inquiries by following the IVR dialogue. IVR systems can respond with pre-recorded or dynamically generated audio to further direct users on how to proceed. In this way, IVR applications may be used to control almost any function where the interface can be broken down into a series of simple interactions. Different real-time streams with voice, data, tones, and events are combined into RTP packets, which may require dynamically changing the RTP header (e.g., with different SSRC numbers). Such RTP packets, once received by the end users, have to be seamlessly played. Unfortunately, the RTP data header validity algorithm in the original RTP standard does not cover the typical IVR applications with dynamically changing SSRC numbers. This leads to the degradation of speech recognition accuracy due to too many missing packets.

RTP is known to be vulnerable to many types of attacks such as spoofing, hijacking, denial of service, traffic manipulation, eavesdropping, and voice injection. As a result, it may be difficult to design a robust RTP packet processing module to prevent the system from rogue RTP attacking. Malicious RTP packets contain wrong and misleading timing information in the sequence number and timestamp. Once locked, they can cause system crashes and un-deterministic system behavior. So, it may be critical for VOIP system stability and reliability to filter out malicious rogue RTP packets once detected.

SUMMARY OF DISCLOSURE

In one implementation, a computer-implemented method for handling rogue data packets is provided. The method may include receiving, using one or more processors, a first data packet having header information associated therewith. The method may further include obtaining, from the header information, sequence number, timestamp and synchronization source identifier information. The method may also include detecting one or more rogue data packets, based upon, at least in part, at least one of the sequence number, timestamp and synchronization source identifier information.

One or more of the following features may be included. In some embodiments, the method may include determining a change in the synchronization source identifier information based upon, at least in part, a resynchronization counter. The method may further include determining a change in the sequence number based upon, at least in part, a resynchronization counter. In some embodiments, the first data packet may be a real-time transport protocol ("RTP") data packet. In some embodiments, determining a change in the timestamp may be based upon, at least in part, a resynchronization counter. Detecting may be based upon, at least in part, adaptive timing resynchronization. In some embodiments, the first data packet may be transmitted during a Voice over Internet Protocol ("VoIP") communication system.

In another implementation, a computer-readable storage medium having stored thereon instructions, which when executed by a processor result in one or more operations for handling rogue data packets is provided. Operations may include receiving, using one or more processors, a first data packet having header information associated therewith and obtaining, from the header information, sequence number, timestamp and synchronization source identifier information. Operations may also include detecting one or more rogue data packets, based upon, at least in part, at least one of the sequence number, timestamp and synchronization source identifier information.

One or more of the following features may be included. In some embodiments, operations may include determining a change in the synchronization source identifier information based upon, at least in part, a resynchronization counter. Operations may further include determining a change in the sequence number based upon, at least in part, a resynchronization counter. In some embodiments, the first data packet may be a real-time transport protocol ("RTP") data packet. In some embodiments, determining a change in the timestamp may be based upon, at least in part, a resynchronization counter. Detecting may be based upon, at least in part, adaptive timing resynchronization. In some embodiments, the first data packet may be transmitted during a Voice over Internet Protocol ("VoIP") communication system.

In yet another implementation, a system for handling rogue data packets is provided. The system may include one or more processors configured to receive a first data packet having header information associated therewith. The one or more processors may be further configured to obtain, from the header information, sequence number, timestamp and synchronization source identifier information. The one or more processors may be further configured to detect one or more rogue data packets, based upon, at least in part, at least one of the sequence number, timestamp and synchronization source identifier information.

One or more of the following features may be included. In some embodiments, the one or more processors may be further configured to determine a change in the synchronization source identifier information based upon, at least in part, a resynchronization counter. The one or more processors may be further configured to determine a change in the sequence number based upon, at least in part, a resynchronization counter. In some embodiments, the first data packet may be a real-time transport protocol ("RTP") data packet. Determining a change in the timestamp may be based upon, at least in part, a resynchronization counter. Detecting is based upon, at least in part, adaptive timing resynchronization.

The details of one or more implementations are set forth in the accompanying drawings and the description below. Other features and advantages will become apparent from the description, the drawings, and the claims.

BRIEF DESCRIPTION OF THE DRAWINGS

FIG. 5 shows an example of a header format consistent with embodiments of the present disclosure;

Like reference symbols in the various drawings may indicate like elements.

DETAILED DESCRIPTION

Embodiments provided herein are directed towards a system and method for handling rogue data packets. In this way, embodiments of the present disclosure relate generally to Voice over Internet Protocol (VoIP) applications in areas that may include, but are not limited to, computer, microprocessor, field programmable gate array ("FPGA"), application specific integrated circuits (ASICs), data networking, telecommunications, and smart phones. Accordingly, embodiments of rogue data packet process 10 may include an RTP packet validation algorithm and a finite state machine, which may be applied to any hardware devices or any software modules.

There are many different kinds of rogue data packets. As used herein, the phrase "rogue data packet" may refer to an RTP data packet having a random RTP header. For example, the payload type, sequence number, time-stamp, and synchronization source (SSRC) identifier in the RTP header could be random. For a typical RTP packet with a 12-byte RTP header, there are a total of $2^{96}$ possibilities for the RTP header. Following the RTP protocol, some of the RTP headers may be classified as invalid and the RTP packet may be discarded (e.g., wrong version number and wrong payload type). In some cases, the rogue RTP packets may be generated by a hostile RTP source (e.g., one having a malicious intent). The rogue RTP packets may also be created by the overlapping of an authentic RTP stream and another unauthentic RTP stream at the same time, which may be caused by the malfunctioning of some networking devices.

Figure 1:
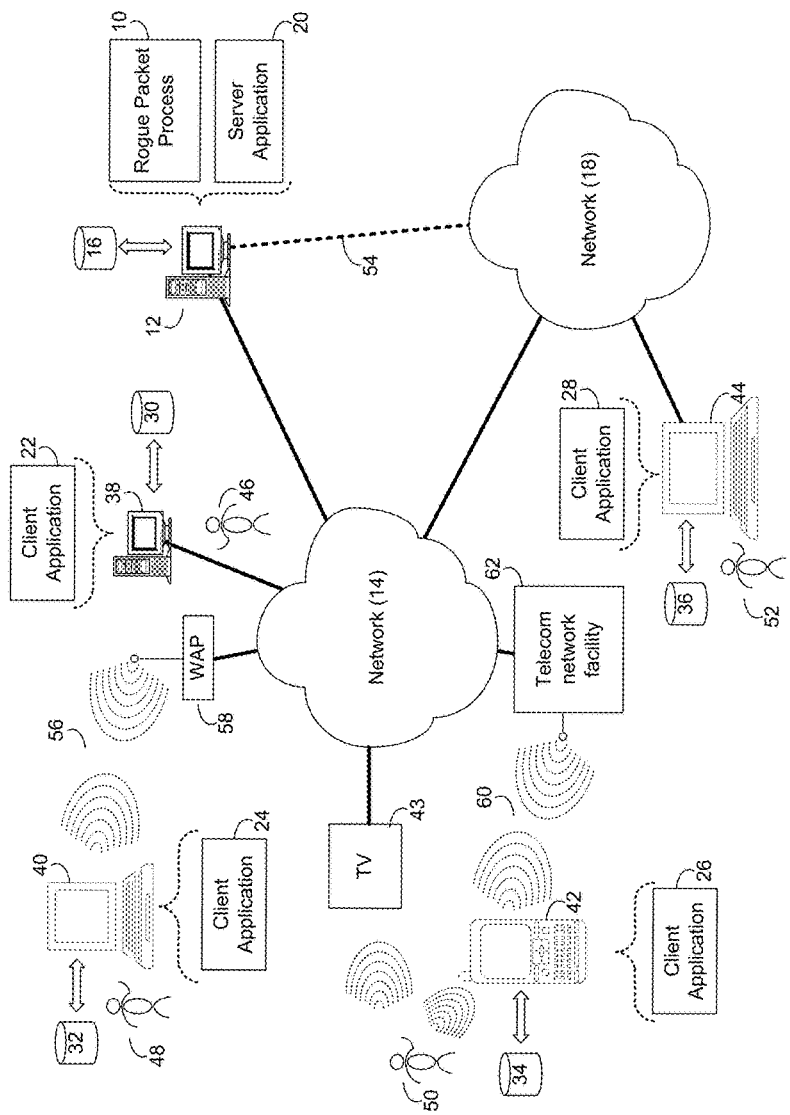
FIG. 1 is a diagrammatic view of a rogue data packet process in accordance with an embodiment of the present disclosure.
Figure 2:
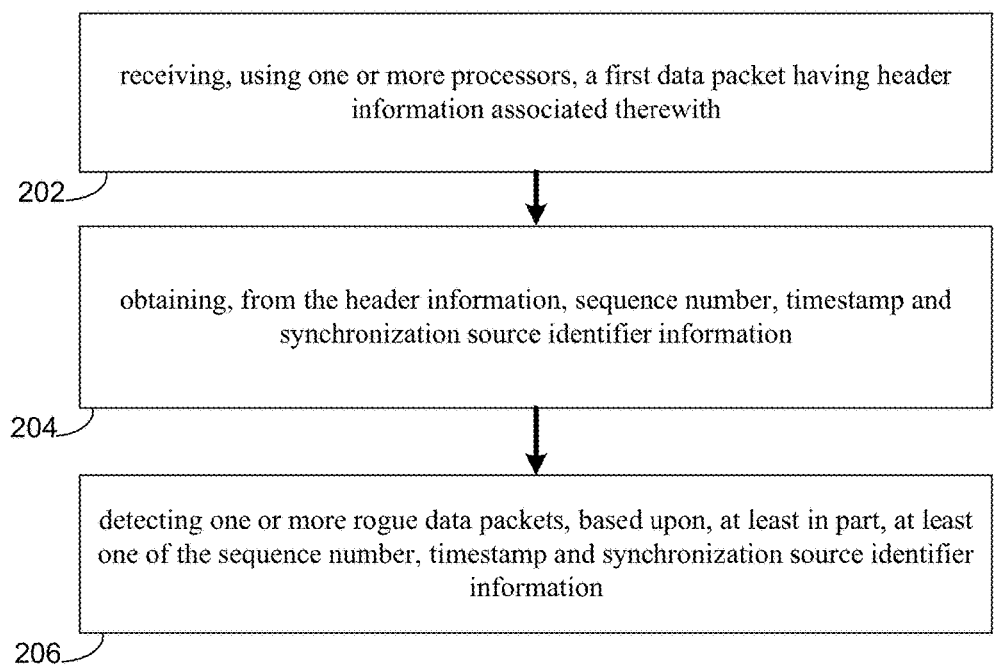
FIG. 2 is a flowchart of a rogue data packet process in accordance with an embodiment of the present disclosure.

Referring to FIG. 1, there is shown a rogue data packet process 10 that may reside on and may be executed by computer 12, which may be connected to network 14 (e.g., the Internet or a local area network). Server application 20 may include some or all of the elements of rogue data packet process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-8, rogue data packet process 10 may include receiving (202) a first data packet having header information associated therewith. The rogue data packet process may further include obtaining (204), from the header information, sequence number, timestamp and synchronization source identifier information. The rogue data packet process 10 may also include detecting (206) one or more rogue data packets, based upon, at least in part, at least one of the sequence number, timestamp and synchronization source identifier information. Rogue data packet process 10 may utilize one or more counters in order to determine changes in the synchronization source identifier information, the sequence number, and the timestamp information associated with a data packet header. Rogue data packet process 10 may also utilize adaptive timing resynchronization techniques as are discussed in further detail hereinbelow.

The instruction sets and subroutines of rogue data packet process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, rogue data packet process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively)

coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of rogue data packet process 10. Accordingly, rogue data packet process 10 may be a purely server-side application, a purely client-side application, or a hybrid server-side/client-side application that is cooperatively executed by one or more of client applications 22, 24, 26, 28 and rogue data packet process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and rogue data packet process 10 directly through network 14 or through secondary network 18. Further, computer 12 may be connected to network 14 through secondary network 18, as illustrated with phantom link line 54. In some embodiments, users may access rogue data packet process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

Figure 3:
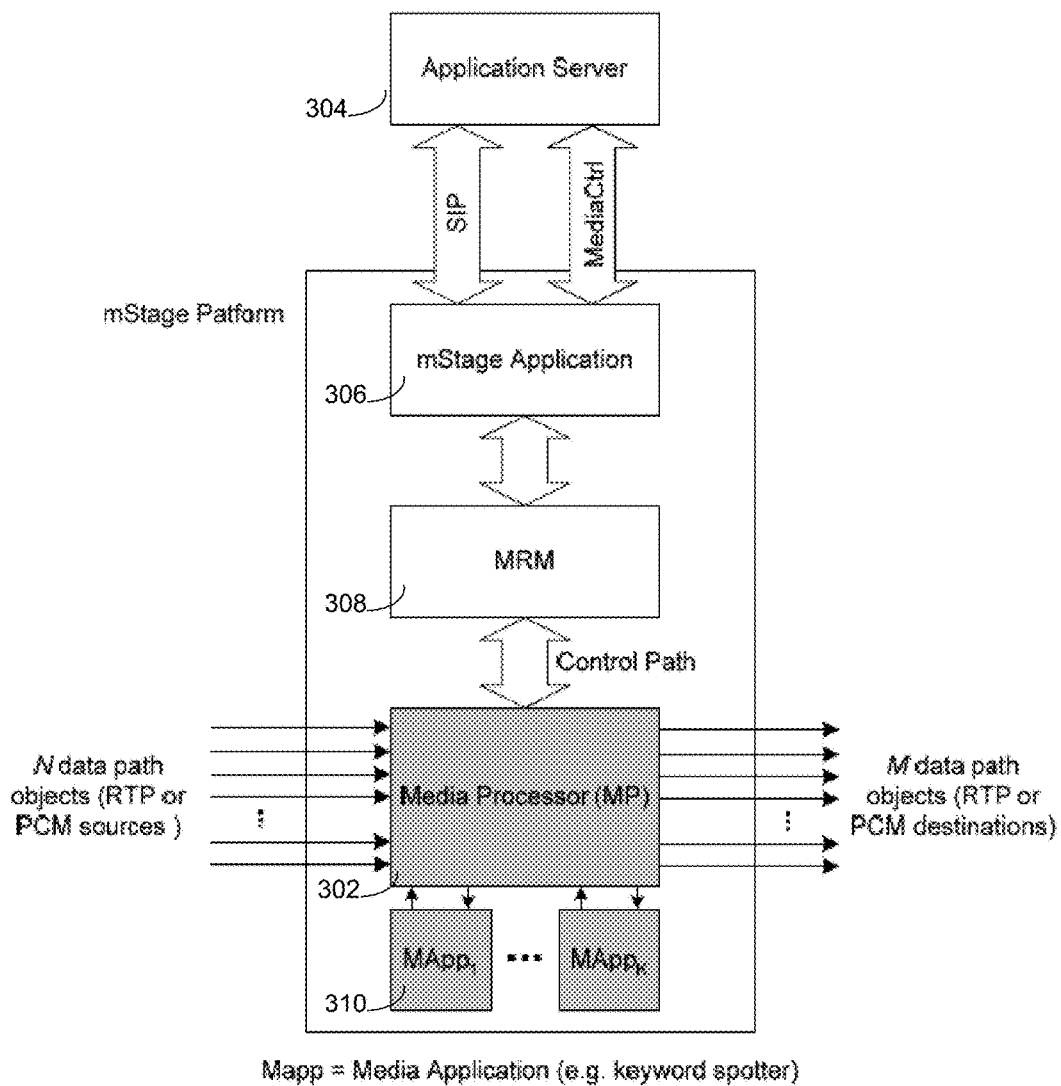
FIG. 3 is a diagrammatic view of a VoIP model consistent embodiments of the present disclosure.

Referring now to FIG. 3, a diagram depicting a VoIP model consistent with an embodiment of rogue data packet process 10 is provided. Embodiments of the VOIP platform 300 described herein provide a packet-based network, offering Voice Quality Assurance (VQA), trans-coding, RTP packet processing, jitter buffer for network impairments, etc. FIG. 3 shows one example of a system model of a VOIP platform 300 and the logical position of a Media Processor (MP) 302 within the VOIP platform. It should be emphasized that this is a logical model, which makes no assumptions about the physical locations of the various components (whether they are running on the same hardware, processor, card etc). In some embodiments, media processor 302 may include multiple instantiations of Media Processor Units (MPUs), running on a single or multiple processor cores.

In some embodiments, Application Server 304 may be a hardware device or a software module that may be configured to receive one or more signaling messages, such as the Session Initiation Protocol (SIP) signaling communication messages including the SIP status messages in a typical VOIP application. The Session Description Protocol (SDP) contains the rules that define how multimedia sessions can be set up to allow all end points to effectively participate in the session. The SDP messages may include, but are not limited to, owner and creator IP address and its type, median description such as supported list of codec types and RTP payload type, media attributes such as sampling rate, telephone event payload type, packetization time in terms of milliseconds, etc. In this particular example, the VOIP platform is referred to as "mStage", where the mStage Application 306 may be configured to support different features and functions. Combined with SIP messages, they may be processed by the media resource manager (MRM) 308, running on the control path. In some embodiments, MP 302 may be configured to perform some or all operations related to the median payload such as RTP payload. The media application (MA) module 310 may include different components such as VQA algorithms, trans-coding, keyword spotter, tone and events detection and generation, etc.

Figure 4:
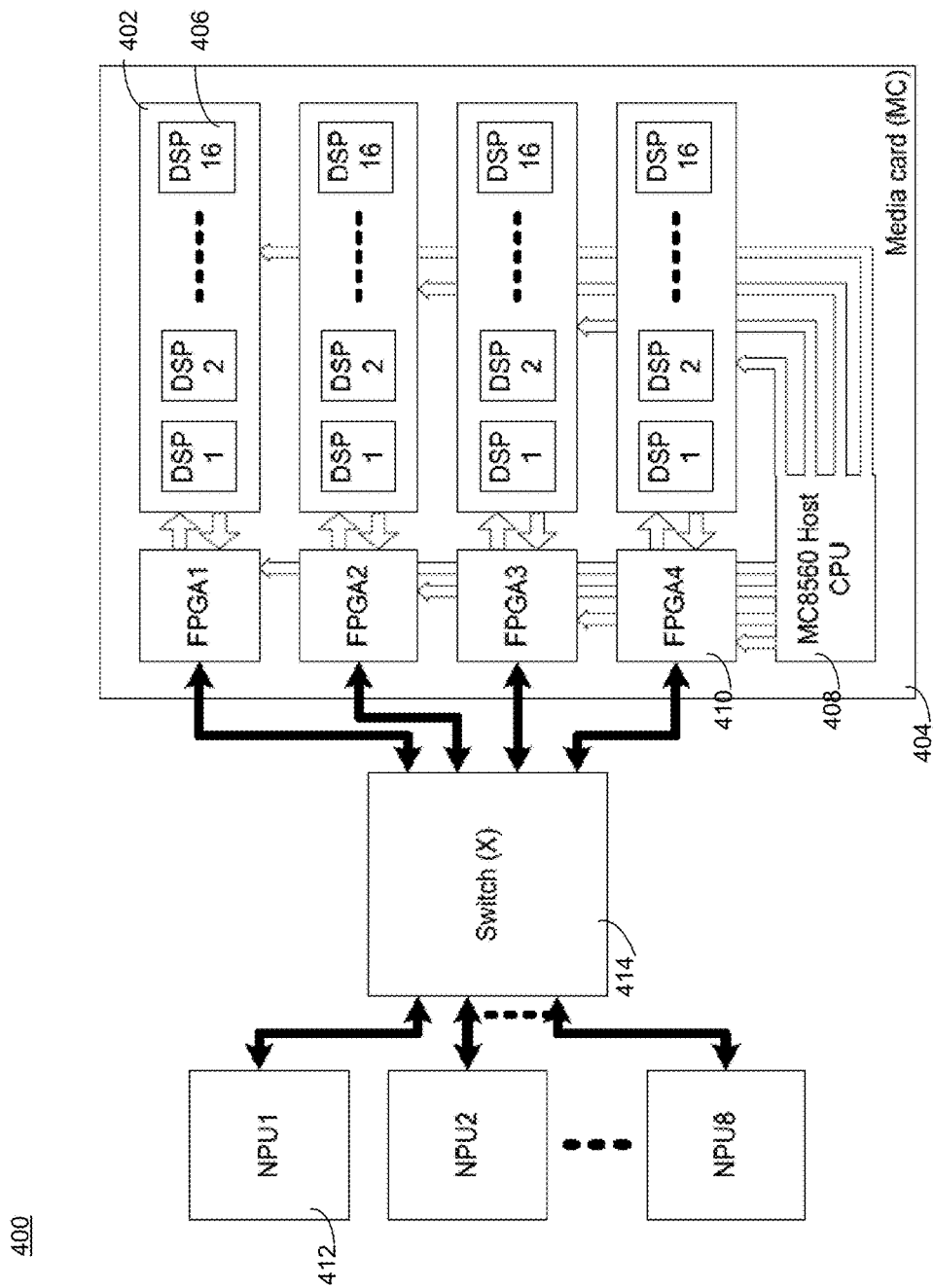
FIG. 4 is a diagrammatic view of a VoIP model consistent with embodiments of the present disclosure.

Referring now to FIG. 4, a diagram depicting an embodiment of another VoIP model is provided. In this particular example, a VOIP platform model 400 showing the configuration of the physical Media Processing Cards (MPCs) 402 is provided, where up to nine active MPCs may be allocated on media card 404. Each MPC may have a number of digital signal processors ("DSPs") 406 with a maximum of 64 DSPs (e.g., TI Janus—C5561 with each DSP consisting of six TMS320C55xx cores running at 300 MHz). Each media card 404 may contain a host processor 408 (e.g., Motorola 8560), which may function as a master for DSPs 406. In this particular example, each group of 16 DSPs may be connected to an FPGA 410. The four FPGAs (which may be physically implemented in a single device) are connected to up to 8 Network Processing Units 412 (NPUs) via switch fabric (X) 414.

As discussed above, in some embodiments the rogue data packet process 10 described herein may be configured to operate upon RTP data packets. RTP is designed to support real time traffic in applications such as voice and video. The RTP header may indicate what type of audio encoding is contained in each packet so that senders can change the encoding during a call.

An example of the RTP fixed header format 500 is shown in FIG. 5. As depicted in the Figure, a number of fields may be associated with the RTP header. Examples of information that may be included within an RTP header are provided below:

Version (V): =2

Padding (P): If the padding bit is set, the packet contains one or more additional padding octets at the end that are not part of the payload. The last octet of the padding contains a count of how many padding octets should be ignored, including itself.

Extension (X): If the extension bit is set, the fixed header must be followed by exactly one header extension.

CSRC count (CC) The CSRC count contains the number of CSRC identifiers that follow the fixed header Marker (M): To allow significant events such as frame boundaries to be marked in the packet stream.

Payload Type (PT): This field identifies the format of the RTP payload and determines its interpretation by the application.

Sequence Number: The sequence number increments by one for each RTP data packet sent, and may be used by the receiver to detect packet loss and to restore packet sequence. The initial value of the sequence number should be random.

Timestamp: The timestamp reflects the sampling instant of the first octet in the RTP packet. The sampling instant must be derived from a clock that increments monotonically and linearly in time to allow synchronization and jitter calculations. The initial value of the timestamp should be random.

Synchronizing source identifier ("SSRC"): The SSRC field identifies the synchronization source. The identifier should be chosen randomly. If a source changes its source transport address, it must choose a new SSRC identifier to avoid being interpreted as a looped source Contributing source identifier ("CSRC"): There can be 0 to 15 items. The CSRC list identifies the contributing sources for the payload contained in this packet.

In some embodiments, rogue data packet process 10 may combine SSRC, timestamp, and sequence number information from the RTP header of each RTP packet into a new RTP packet validation algorithm. Rogue data packet process 10 may use this information to determine whether a rogue data packet exists (e.g., a new state STATE_ROGUE is detected). In this way, rogue data packet process 10 may be used to solve the rogue RTP packet problem, which is a common issue in numerous applications such as VoIP.

Embodiments of rogue data packet process 10 may be used to address various state transitions, for example, where the SSRC number is frequently changed during the middle of a call (e.g. in an interactive voice response "IVR" application during the SSRC verification stage). In this way, packet process 10 may also include the construction and utilization of a new resynchronization counter. When the packet is in sequence, if the resynchronization counter is bigger than zero, the RTP packet state is detected as having a rogue status (e.g. STATE_ROGUE). Additionally and/or alternatively, if the packet is out of sequence, RTP packet state may also be detected as having a rogue status.

In some embodiments, rogue data packet process 10 may be configured to identify a state transition where the sequence number jump is smaller than or equal to a particular value (e.g., RTP_SEQ_MOD−MAX_MISORDER). For example, process 10 may address the scenario where a sequence number has made a very large increase. If the new resynchronization counter is bigger than zero, the RTP packet state is detected as having a rogue status (e.g., STATE_ROGUE).

Additionally and/or alternatively, rogue data packet process 10 may be configured to identify the state transition where the sequence number has a large increase but the sequence number does not equal a bad sequence number. For example, the timestamp value may be used to classify rogue RTP packets among all bad RTP packets having a large sequence number increase as well as a large timestamp increase. Embodiments of data packet process 10 may include an approach for calculating the timestamp difference between the current timestamp value and the previous timestamp value from the RTP state memory. After obtaining the timestamp difference value, if the value is bigger than a particular threshold (e.g., MAX_TS_JUMP=144000, this may indicate an 18 seconds timestamp difference with 8000 Hz sampling frequency), the RTP packet state may also be detected as having a rogue status (e.g. STATE_ROGUE). Embodiments of rogue data packet process 10 may be used to accurately estimate the timestamp changes in the RTP packets, which may be used in other VoIP modules such as jitter buffer ("JB"), packet loss concealment ("PLC"), and acoustic echo cancellation ("AEC").

An example of a header file (rtp.h) is provided below in the Appendix by way of an example. It should be noted that any portions of code that are included in the present disclosure are included merely by way of example and are not intended to limit the scope of the present disclosure.

In some embodiments, when a call is first established, by using session initiation protocol ("SIP") signaling messages in a typical VoIP application, the RTP module state memory with data structure RTP_SRC_STATE may be allocated. This RTP module state memory is pointed by a pointer (e.g., RTP_SRC_STATE*pState). The RTP state memory may be initialized by calling a function (e.g., RTPInit(pState)) after the SIP message negotiation stage, i.e., no actual RTP packets show up yet, where the function RTPInit( ) is provided in the Appendix for reference. In this function, the RTP module state variables are initialized (e.g., pState->probation=MIN_SEQUENTIAL; pState->ssrcHP=−1) where a particular number (e.g., MIN_SEQUENTIAL) of sequential packets are required in order to declare a source valid for the newly arrived SSRC identifier. A state variable (e.g., pState->ssrcHP) may be added to represent the number of SSRC changes during the call.

In some embodiments, when the first RTP packet shows up after the SIP signaling negotiation stage, a pointer (e.g., RTP_HEADER*pInputPacket) may be used to point to the RTP header of the RTP packet. The SSRC identifier may be saved for this media stream.

```
UINT32 ssrc;
ssrc = ((UINT32)pInputPacket->ssrcHigh)<<16 | pInputPacket->ssrcLow;
if (pState->ssrc != ssrc)
{
    pState->ssrcHP++;
    pState->ssrc = ssrc;
}
```

By the above convention, if the SSRC number does not change during a call, the SSRC increase (e.g., pState->ssrcHP) may be set to zero after the first RTP packet is received.

In some embodiments, upon the arrival of a new packet, RTP header validity check may be performed according to RFC 3550 Appendix A.1. Embodiments of rogue data packet process 10 may include determining codec type, frame and payload sizes based on packet payload type (e.g., PT field) and packet length. The SSRC, sequence number, and timestamp information may be extracted from the first received packet and used as corresponding base values for outgoing RTP packets. RTP statistics may then be accumulated. In some embodiments, the RTP header may be validated (e.g., using RFC 3550 Appendix A—Algorithms).

Figure 6:
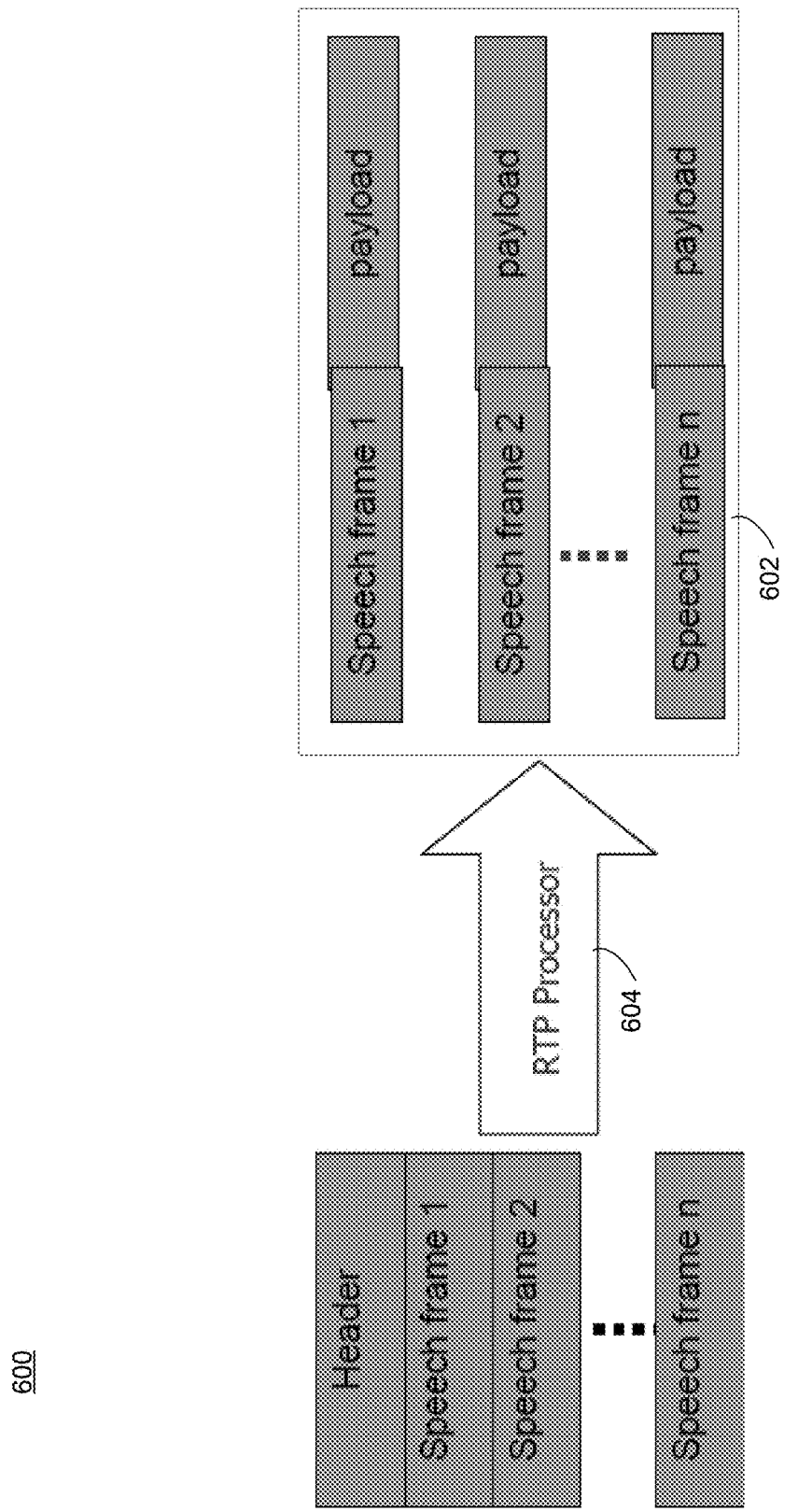
FIG. 6 is a diagrammatic view of an RTP and jitter buffer module consistent with embodiments of the present disclosure.

Referring now to FIG. 6, a diagram depicting an RTP and jitter buffer module consistent with rogue data packet process 10 is provided. In this particular example, jitter buffer (JB) 602 may receive speech frames from RTP processor 604 where RTP packets are broken down into speech frames.

Figure 7:
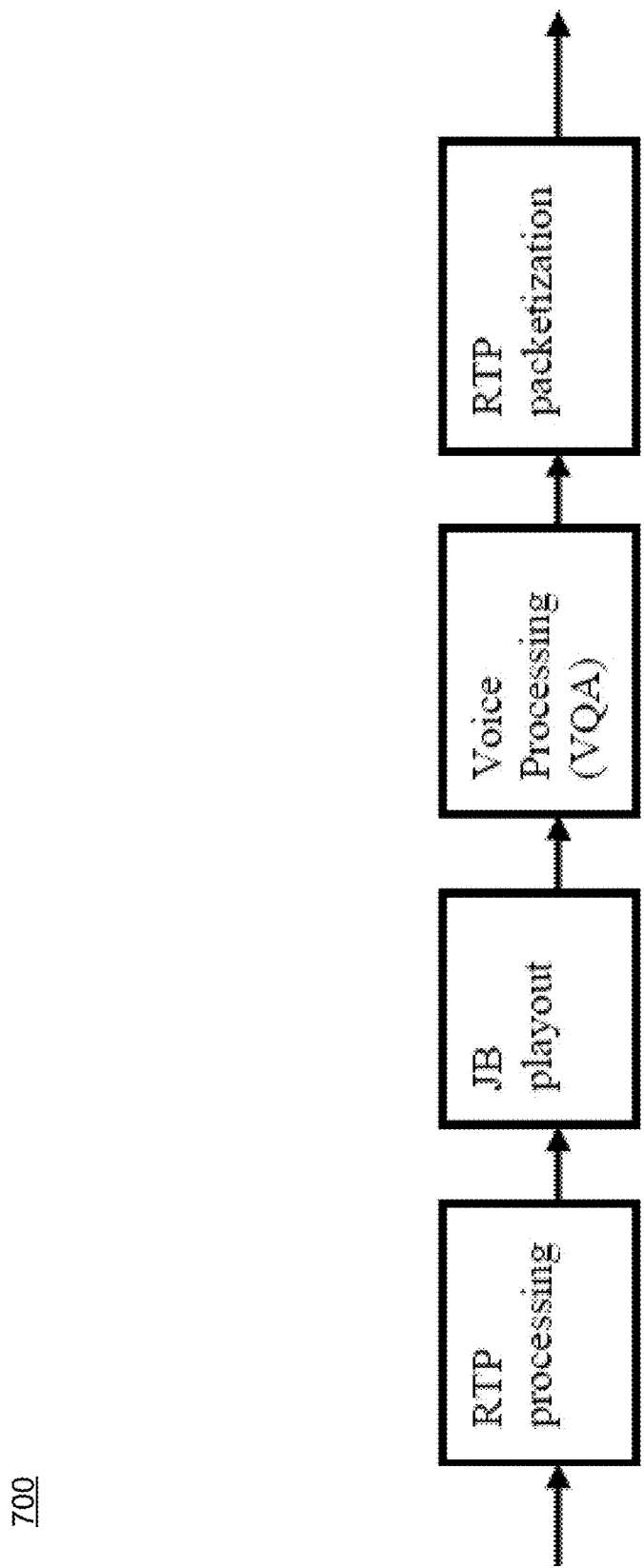
FIG. 7 is a diagrammatic view of a voice processing module consistent with embodiments of the present disclosure.

Referring also to FIG. 7, a diagram depicting a voice enhancement device 700 offering Voice Quality Assurance (VQA) with both an RTP module and a JB module is provided. In this particular example, after JB module, the voice frames may be decoded using a speech decoder depending on the codec type used in the RTP packet. The decoded speech data may be processed by the VQA module for voice enhancement, which may also include packet loss concealment (PLC) algorithms. Then, a speech codec may be used to encode the voice enhanced data. The type of speech codec used for speech encoding may be specified by the SIP signaling messages. When a sufficient amount of data is encoded, the RTP packet may be composed and sent out by the RTP packetization module.

Embodiments of rogue data packet process 10 may utilize a finite state machine, which is described in further detail herein below. In some embodiments, an RTP packet validation algorithm may be called for each RTP packet. There are four possible states defined in this function (e.g., STATE_BAD, STATE_GOOD, STATE_RESYNCH, and STATE_ROGUE). STATE_BAD indicates that the validation is failed for the packet, STATE_GOOD indicates that the packet is valid and has passed the validation algorithm, STATE_RESYNCH indicates that the packet contains misleading timing information such as sequence number and timestamp and the packet is in a state for timing resynchronization, and STATE_ROGUE indicates that the packet is in a rogue state, respectively. Existing approaches that handle RTP data packets utilize only the first two states. Embodiments of rogue data packet process 10 may also incorporate a state for timing resynchronization (e.g., STATE_RESYNCH) and a state that identifies that an RTP packet is in a rogue state (e.g., STATE_ROGUE). The algorithm may be implemented using a variety of techniques, for example, via the following function:

```
static RTP_PKT_STATES RTPPacketValidate(RTP_SRC_STATE
*pState,
    RTP_HEADER *pPacket)
```

In the above function, pPacket is a pointer pointing to the current RTP header of the packet and pState is a pointer pointing to the RTP state. By calling this function, the RTP packet may be validated using the sequence number, timestamp, and the SSRC number. In contrast, in existing approaches only the sequence number is validated and the SSRC changes in the middle of a call are not considered. The local variables are defined below:

```
UINT16 udelta = pPacket->seq - pState->maxSeq;
UINT32 uTSdelta, uTScur, uTSpre;
```

In operation, an example of an RTP packet validation algorithm consistent with embodiments of rogue data packet process 10 is described below. In this particular example, suppose that the probation counter (e.g., pState->probation) is not zero (referred to herein as "case 1"). In this case, the new RTP source has not been declared as valid based on the SSRC verification. This may be caused by the SSRC verification at the beginning of the call, or by the SSRC changes in the middle of call ("MoC"), which are described separately.

In this particular example, suppose that the SSRC increase (e.g., pState->ssrcHP) is smaller than one, which means the SSRC verification is performed at the beginning of the call. If the packet is in sequence, then decrease the probation counter (e.g., pState->probation) by one. If the probation counter (e.g., pState->probation) becomes zero, then perform the following operations: i) A function may be called (e.g., RTPInitSequence( )) to initialize the RTP call state; ii) Increase the counter pState->received by one; iii) Finally the function is returned with STATE_GOOD. If the packet is out of sequence, then update the probation counter (e.g., pState->probation) with value (MIN_SEQUENTIAL−1), where MIN_SEQUENTIAL is the minimal number of packets with sequential sequence numbers required for the SSRC validity check. If the function comes here, it is returned with STATE_BAD. In both cases, pState->maxSeq is saved with latest sequence number pPacket->seq. The latest timestamp (pPacket->tsHigh, pPacket->tsLow) is also saved in pState->maxTS.

Using a different example, now consider the opposite scenario to that described above, which means the SSRC verification is performed in the middle of call. In this example, suppose that the packet is in sequence. Rogue RTP packet verification may be performed here. For example, if the resynchronization counter (e.g., pState->rtpResynchCnt) is bigger than zero, the resynchronization counter may be decreased by one. The function is returned with STATE_ROGUE. In the event that resynchronization counter is zero, reset the probation counter (e.g., pState->probation) to zero, call the function RTPInitSequence( ), and increase the counter (e.g. pState->received) by one. As discussed above, pState->received indicates the number of packets received with the same SSRC. Then, the function may be returned with STATE_GOOD.

If the packet is out of sequence, first reset the probation and resynchronization counters (e.g., pState->probation and pState->rtpResynchCnt) to (MIN_SEQUENTIAL−1) and MIN_RESYNCH1 respectively, where MIN_RESYNCH1 is the minimal number of packets with sequential sequence numbers required for the timing resynchronization in order to jump out this rogue RTP state. Then, the function is returned with STATE_ROGUE. In all cases, pState->maxSeq is saved with latest sequence number pPacket->seq. The latest timestamp (pPacket->tsHigh, pPacket->tsLow) is also saved in pState->maxTS.

Using another example, suppose that udelta is smaller than MAX_DROPOUT (referred to herein as "case 2"), where udelta is the incremental change of the sequence number compared with previous valid sequence number, and MAX_DROPOUT is the maximum allowed sequence number change in consecutive two packets in order to declare the later packet to be in order, respectively. In order for this situation to occur the situation described in case 1 cannot happen. In this case, the measured sequence number change is small. For a VoIP call to go smoothly, typically this is the situation. The process may check to see if the sequence number is wrapped since it is often a 16-bit variable. If the sequence number (e.g., pPacket->seq) is smaller than the highest sequence number seen (e.g., pState->maxSeq), increase a counter indicating a shifted count of sequence number cycles (e.g., pState->cycles) by one to indicate that the sequence number (e.g., pPacket->seq) wraps around once. Finally, pState->maxSeq may be saved with the latest sequence number pPacket->seq. The latest timestamp (e.g., (pPacket->tsHigh, pPacket->tsLow)) may also be saved in pState->maxTS.

In some embodiments, rogue data packet process 10 may be configured to identify a state transition where the sequence number jump is smaller than or equal to a particular value (e.g., RTP_SEQ_MOD−MAX_MISORDER), where RTP_SEQ_MOD is a guard value (e.g., 0x10000) for a 16-bit integer and MAX_MISORDER is a threshold value to measure the sequence number jump. For example, process 10 may address the scenario where a sequence number has made a very large increase. If the new resynchronization counter equals zero, the RTP packet state is detected as having a resynchronization status (e.g. STATE_RESYNCH).

For example, suppose that udelta is smaller than or equal to (RTP_SEQ_MOD−MAX_MISORDER) (referred to herein as "case 3"). In order for case 3 to occur, cases 1 and 2 cannot occur. First, consider a scenario where the sequence number (e.g., pPacket->seq) equals to the last bad sequence number (e.g., pState->badSeq). The condition indicates that the sequence number has made a very large jump. Rogue RTP packet verification may be performed here. If the resynchronization counter (e.g., pState->rtpResynchCnt) is bigger than zero, the resynchronization counter is decreased by one. The bad sequence number (e.g., pState->badSeq) is set to (pPacket->seq+1) & 0xFFFF. The function is returned with STATE_ROGUE. In the event that the resynchronization counter (e.g., pState->rtpResynchCnt) is zero, call the function RTPInitSequence( ). Then the function may be returned with STATE_RESYNCH, where STATE_RESYNCH indicates that the packet contains misleading timing information and the packet is in a state for timing resynchronization.

In another example, the sequence number (e.g., pPacket->seq) does not equal the last bad sequence number (e.g., pState->badSeq). In this example, the resynchronization counter (e.g., pState->rtpResynchCnt) is set to a configurable value (e.g., MIN_RESYNCH2) and the bad sequence number may be set to a new value having the current sequence number plus 1 using 16-bit precision (e.g., pState->badSeq is set to (pPacket->seq+1) & 0xFFFF). Here, the timestamp value may be used to classify rogue RTP packets among all bad RTP packets having a large sequence number jump as well as a big timestamp jump. Rogue data packet process 10 may read the current timestamp value (e.g., uTScur=[pPacket->tsHigh, pPacket->tsLow]) from the RTP header and then read the previous valid timestamp value (e.g., uTSpre=pState->maxTS) from the RTP state memory. After the wrap-around scenario is considered, the precise timestamp difference may be obtained as discussed below.

In another example, uTScur is bigger than or equal to uTSpre, where uTScur is the current timestamp and uTSpre is the previous valid timestamp. If the difference between uTScur−uTSpre is bigger than or equal to 0x7FFFFFFF, the timestamp has a "wrap around", where the timestamp overflows and goes back to the beginning because of the nature of fixed-point operations. In this case, the process may calculate the timestamp difference as follows: uTSdelta= ((UINT32) 0xFFFFFFFF−uTScur)+uTSpre+1. In the case that there is no timestamp wrap around, calculate the timestamp difference: uTSdelta=uTScur−uTSpre.

In yet another example, uTScur may be smaller than uTSpre. In the case that the difference between uTScur−uTSpre is bigger than or equal to 0x7FFFFFFF, the timestamp has a wrap around. In this case, the process may calculate the timestamp difference as follows: TSdelta= ((UINT32) 0xFFFFFFFF−uTScur)+uTSpre+1. In the case that there is no timestamp wrap around, calculate the timestamp difference: uTSdelta=uTScur−uTSpre. After obtaining the timestamp difference value, if uTSdelta is bigger than MAX_TS_JUMP, the function is returned with STATE_ROGUE. Otherwise, the function is returned with STATE_BAD.

In another example, suppose that all conditions in Case 1, Case 2, and Case 3 are not satisfied, then the RTP packet is a duplicate or re-ordered packet (referred to herein as "case 4"). After the execution of Case 1 to Case 4, if the function is not returned yet, increase the packet counter received with the same SSRC (e.g., pState->received) by one. After that, the function is returned with state STATE_GOOD. Additional examples of code corresponding to some of these operations may be found in the Appendix.

Embodiments of rogue data packet process 10 may provide adaptive timing resynchronization for rogue RTP data packets. As discussed above, the RTP packet validation algorithm described above may generate one of four states (e.g., STATE_BAD, STATE_GOOD, STATE_RESYNCH, and STATE_ROGUE). The RTP packet state may be obtained by calling this function:

rtpPktValidate=RTPPacketValidate(pState,pInputPacket)

where pState is the RTP state for this call, pInputPacket is a pointer pointing to the RTP header of current RTP packet, and rtpPktValidate is an instance of RTP_PKT_STATES. In the case that rtpPktValidate equals to STATE_RESYNCH, the jitter buffer (JB) is initialized. In the event that rtpPktValidate is equal to STATE_ROGUE, the current packet is discarded and the packet discard counter (e.g., pState->packetsDiscarded) may be increased by one. At this point, the RTP packet processing function may be returned with an indication that the RTP packet is invalid. If invalid, the RTP packet processing function may be exited. In other cases, the rest of the RTP packet processing continues.

As discussed herein, and also as shown in Appendix A, in some embodiments the finite state machine described herein may rely upon the setup of one or more threshold values (e.g., #define MIN_RESYNCH0=0, #define MIN_RESYNCH1=0, #define MIN_RESYNCH2=4, and #define MAX_RESYNCH=4).

In some embodiments, these may be implemented in a programmable memory in a real system. For example, they may be set by command line interface ("CLI") on a per call basis (e.g., the values may be different for each call). In some cases, the first three thresholds may be initially set to zero.

In some embodiments, rogue data packet process 10 may be configured to set the threshold values in an adaptive way, resulting in an adaptive timing resynchronization scheme to deal with rogue RTP packets. Malicious RTP packets contain incorrect and misleading timing information in the sequence number and timestamp. Once locked, they can cause system crashes and un-deterministic system behavior. So it is critical for VOIP system stability and reliability to filter out malicious rogue RTP packets once detected.

In some embodiments, the finite state machines associated with rogue data packet process 10 may determine that both the sequence number and timestamp value in an incoming RTP packet have randomly jumped, the process may adaptively increase the penalty of timing synchronization for rogue RTP packets afterwards. This can be incorporated into the finite state machine in Case 3 when uTSdelta is bigger than MAX_TS_JUMP. Before the function is returned with STATE_ROGUE, set one or more of the thresholds in one of the following adaptive ways.

In some embodiments, the threshold values may be set to the maximal value (e.g., set MIN_RESYNCH0, MIN_RESYNCH1, MIN_RESYNCH2 to the maximal value MAX_RESYNCH). Additionally and/or alternatively, the threshold may be increased by one (e.g., MIN_RESYNCH0=MIN_RESYNCH0+1,
MIN_RESYNCH1=MIN_RESYNCH1+1,
MIN_RESYNCH2=MIN_RESYNCH2+1). In this case, MIN_RESYNCH0, MIN_RESYNCH1, and MIN_RESYNCH2 may not exceed the maximal value MAX_RESYNCH.

In some embodiments, rogue data packet process 10 may utilize the finite state machine with adaptive timing synchronization in a number of different ways. For example, suppose initially the three thresholds (e.g., MIN_RESYNCH0, MIN_RESYNCH1, MIN_RESYNCH2) are zero. If during a call, suddenly both the sequence number and timestamp value in one RTP packet are randomly increased, and our FSM in Case 3 finds out that uTSdelta is bigger than MAX_TS_JUMP. At this point, the three thresholds (e.g., MIN_RESYNCH0, MIN_RESYNCH1, MIN_RESYNCH2) may be set to one. This increases the penalty of timing synchronization for rogue RTP packets that are received next. When a rogue RTP packet with wild and random SSRC, sequence number, and timestamp value shows up subsequently, previous increased threshold values (e.g., MIN_RESYNCH0, MIN_RESYNCH1, MIN_RESYNCH2) will be in force. Additionally and/or alternatively, MIN_RESYNCH0, MIN_RESYNCH1, MIN_RESYNCH2 are increased to two for the next rogue RTP packets until all three thresholds reach the value MAX_RESYNCH.

In some embodiments, rogue data packet process 10 may be configured to estimate changes in the RTP timestamp for rogue RTP packets. Accordingly, process 10 may obtain accurate timestamp changes in the RTP packets for other modules such as jitter buffer, packet loss concealment (PLC), and adaptive echo cancellation (AEC). The algorithm included below may be used to generate an estimate of the timestamp change with a maximum bound (e.g., MAX_TS_DIFF), which may be programmable. The function name is: INT32 TimeStampDiff(UINT32 pre_ref, UINT32 cur_value) where cur_value is current timestamp value, pre_ref is the previous timestamp value for reference. The local variable tsDelta may be defined as signed 32-bit integer. If cur_value is bigger or equals to pre_ref, define tsDelta=cur_value−pre_ref. Otherwise, if ((pre_ref+MAX_TS_DIFF) & 0xFFFFFFFF) is smaller than cur_value, set tsDelta=cur_value−pre_ref. In all other cases, define tsDelta as (INT32)((unsigned long long) 0x100000000−pre_ref+cur_value). If tsDelta is bigger than MAX_TS_DIFF, set tsDelta=MAX_TS_DIFF. In the case that tsDelta is smaller than −MAX_TS_DIFF, set tsDelta=(INT32)−MAX_TS_DIFF. In all other cases, tsDelta is not modified.

Figure 8:
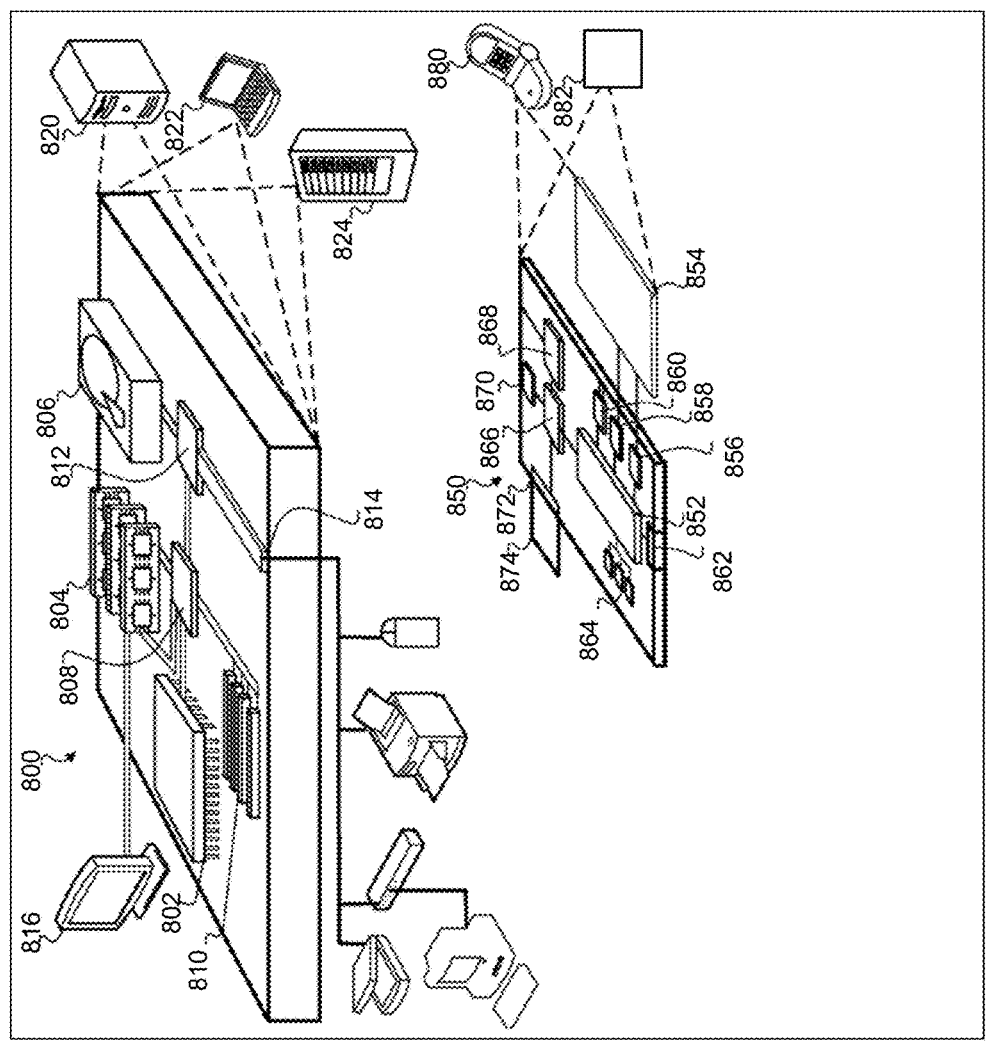
FIG. 8 shows an example of a computer device and a mobile computer device that can be used to implement embodiments of the present disclosure.

Referring now to FIG. 8, an example of a generic computer device 800 and a generic mobile computer device 850, which may be used with the techniques described here is provided. Computing device 800 is intended to represent various forms of digital computers, such as tablet computers, laptops, desktops, workstations, personal digital assistants, servers, blade servers, mainframes, and other appropriate computers. In some embodiments, computing device 850 can include various forms of mobile devices, such as personal digital assistants, cellular telephones, smartphones, and other similar computing devices. Computing device 850 and/or computing device 800 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 800 may include processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, may be interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multiprocessor system).

Memory 804 may store information within the computing device 800. In one implementation, the memory 804 may be a volatile memory unit or units. In another implementation, the memory 804 may be a non-volatile memory unit or units. The memory 804 may also be another form of computer-readable medium, such as a magnetic or optical disk.

Storage device 806 may be capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

High speed controller 808 may manage bandwidth-intensive operations for the computing device 800, while the low speed controller 812 may manage lower bandwidth-intensive operations. Such allocation of functions is exemplary only. In one implementation, the high-speed controller 808 may be coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 may include a processor 852, memory 854, an input/output device such as a display 854, a communication interface 866, and a transceiver 868, among other components. The device 850 may also be provided with a storage device, such as a micro-drive or other device, to provide additional storage. Each of the components 850, 852, 854, 884, 866, and 868, may be interconnected using various buses, and several of the components may be mounted on a common motherboard or in other manners as appropriate.

Processor 852 may execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

In some embodiments, processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

In some embodiments, memory 864 may store information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

Computing device 850 may be implemented in a number of different forms, as shown in the figure. For example, it may be implemented as a cellular telephone 880. It may also be implemented as part of a smartphone 882, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider). Any examples of code provided in the present disclosure are provided merely by way of example and are only provided as one possible way in, which the teachings of the present disclosure may be implemented.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

APPENDIX a. Example of Source Code for the Finite State Machine
An example of the C code on the finite state machine is listed below for reference.

```c
typedef enum
{
                STATE_BAD,
                STATE_GOOD,
                STATE_RESYNCH,
                STATE_ROGUE
}RTP_PKT_STATES;
/* Sequence number processing constants */
#define RTP_SEQ_MOD     ((UINT32) 0x10000)
#define MAX_DROPOUT         100         /* 3000 original value */
#define MAX_MISORDER        100
#define MIN_SEQUENTIAL      2
#define MIN_RESYNCH0        0
#define MIN_RESYNCH1        0
#define MIN_RESYNCH2        4
#define MAX_RESYNCH         4
#define RTP_10MS_INTERVAL 80
#define RTP_TS_MAX_MISORDER                 (RTP_10MS_INTERVAL * MAX_MISORDER)
#define MAX_TS_JUMP_SECONDS   18
#define MAX_TS_JUMP         ((UINT32) RTP_TS_MAX_MISORDER *
                                        MAX_TS_JUMP_SECONDS)
static void RTPInitSequence(RTP_SRC_STATE *pState, RTP_HEADER *pPacket)
{
    pState->baseSeq = pPacket->seq;
    pState->maxSeq = pPacket->seq;
    pState->maxTS = ((UINT32)pPacket->tsHigh)<<16 | pPacket->tsLow;
    pState->badSeq = RTP_SEQ_MOD + 1; /* so seq == bad_seq is false */
    pState->cycles = 0;
    pState->received = 0;
    pState->receivedPrior = 0;
    pState->expectedPrior = 0;
    pState->rtpResynchCnt = MIN_RESYNCH0;
    pState->outputTimestamp = ((UINT32)pPacket->tsHigh)<<16 pPacket->tsLow;
    pState->outputSeq = pPacket->seq;
    pState->seqHP++;
}
void RTPInit(RTP_SRC_STATE_PTR pState)
{
    /* initialize sequence */
    pState->baseSeq = 0;
    pState->maxSeq = 0;
    pState->maxTS = 0;
    pState->badSeq = RTP_SEQ_MOD + 1; /* so seq == bad_seq is false */
    pState->cycles = 0;
    pState->received = 0;
    pState->receivedPrior = 0;
    pState->expectedPrior = 0;
    pState->lost = 0;
    pState->fractionLost = 0;
    pState->ssrcHP = -1;
    pState->seqHP = -1;
    /* set up for probation */
    pState->probation = MIN_SEQUENTIAL;
    pState->jitter = 0;
```

APPENDIX-continued

```
        pState->prevEncodedFrames = 0;
        pState->packetsReceived = 0;
        pState->packetsSent = 0;
        pState->bytesSent = 0;
        pState->packetsDiscarded = 0;
        pState->rtcpReceived = 0;
        pState->rtcpSent = 0;
        pState->rfc2833Rxed = 0;
        pState->rfc2833Txed = 0;
        pState->codecLocked = FALSE;
        pState->byeReceived = FALSE;
        pState->rtp_sidmis_disc = 0;
        pState->rtcp_sidmis_disc = 0;
        pState->rtpResynchCnt = MIN_RESYNCH0;
        /* set SSRC to invalid value */
        //pState->ssrc = 0;
}
static       RTP_PKT_STATES       RTPPacketValidate(RTP_SRC_STATE       *pState,
RTP_HEADER *pPacket)
{
UINT16 udelta = pPacket->seq - pState->maxSeq;
UINT32 uTSdelta, uTScur, uTSpre;
/*
* Source is not valid until MIN_SEQUENTIAL packets with
* sequential sequence numbers have been received.
*/
        if(pState->probation)
        {
                if (pState->ssrcHP < 0x1){
                        /* packet is in sequence */
                        if(pPacket->seq == pState->maxSeq +1)
                        {
                                pState->probation--;
                                pState->maxSeq = pPacket->seq;
                                pState->maxTS = ((UINT32)pPacket->tsHigh)<<16 | pPacket->tsLow;
                                if(pState->probation == 0)
                                {
                                        RTPInitSequence(pState, pPacket);
                                        pState->received++;
                                        return STATE_GOOD;
                                }
                        }
                        else
                        {
                                pState->probation = MIN_SEQUENTIAL - 1;
                                pState->maxSeq = pPacket->seq;
                                pState->maxTS = ((UINT32)pPacket->tsHigh)<<16 | pPacket->tsLow;
                        }
                        return STATE_BAD;
                } else {
                        //for SSRC changes in the middle of calls
                        /* packet is in sequence */
                        if(pPacket->seq == pState->maxSeq + 1)
                        {
                          if (pState->rtpResynchCnt > 0) {
                                pState->rtpResynchCnt--;
                                pState->maxSeq = pPacket->seq;
                                pState->maxTS = ((UINT32)pPacket->tsHigh)<<16 | pPacket->tsLow;
                                return STATE_ROGUE;
                          } else {
                                pState->probation = 0;
                                RTPInitSequence(pState, pPacket);
                                pState->received++;
                                return STATE_GOOD;
                          }
                        }
                        else
                        {
                                pState->probation = MIN_SEQUENTIAL - 1;
                                pState->rtpResynchCnt = MIN_RESYNCH1;
                                pState->maxSeq = pPacket->seq;
                                pState->maxTS = ((UINT32)pPacket->tsHigh)<<16 | pPacket->tsLow;
                                return STATE_ROGUE;
                        }
                }
        }
        else if(udelta < MAX_DROPOUT)
        {
                /* in order, with permissible gap */
                if(pPacket->seq < pState->maxSeq)
```

APPENDIX-continued

```
        {
            /*
             * Sequence number wrapped – count another 64K cycle.
             */
            pState->cycles += RTP_SEQ_MOD;
        }
        pState->maxSeq = pPacket->seq;
        pState->maxTS = ((UINT32)pPacket->tsHigh)<<16 | pPacket->tsLow;
    }
    else if(udelta <= RTP_SEQ_MOD - MAX_MISORDER)
    {
        /* the sequence number made a very large jump */
        if(pPacket->seq == pState->badSeq)
        {
            if (pState->rtpResynchCnt > 0) {
                pState->rtpResynchCnt--;
                pState->badSeq = (pPacket->seq + 1) & 0xFFFF;
                return STATE_ROGUE;
            } else {
                /*
                 * Two sequential packets -- assume that the other side
                 * restarted without telling us so just re-sync
                 * (i.e., pretend this was the first packet).
                 */
                RTPInitSequence(pState, pPacket);
                return STATE_RESYNCH;
            }
        }
        else
        {
            pState->badSeq = (pPacket->seq + 1) & 0xFFFF;
            pState->rtpResynchCnt = MIN_RESYNCH2;
            //check random TS value among all bad packets
            uTScur = ((UINT32)pPacket->tsHigh)<<16 | pPacket->tsLow;
            uTSpre = pState->maxTS;
            if (uTScur >= uTSpre) {
                if (uTScur - uTSpre >= 0x7FFFFFFF) {
                    //wrap-around happens
                    uTSdelta = ((UINT32) 0xFFFFFFFF - uTScur) + uTSpre +1;
                } else {
                    uTSdelta = uTScur - uTSpre;
                }
            } else {
                if (uTSpre - uTScur >= 0x7FFFFFFF) {
                    //wrap-around happens
                    uTSdelta = ((UINT32) 0xFFFFFFFF - uTSpre) + uTScur +1;
                } else {
                    uTSdelta = uTSpre - uTScur;
                }
            }
            if (uTSdelta > MAX_TS_JUMP)
            {
                return STATE_ROGUE;
            } else {
                return STATE_BAD;
            }
        }
    }
    else
    {
        /* duplicate or reordered packet */
    }
    pState->received++;
    return STATE_GOOD;
}
```
b. Example of Source Code for RTP Timestamp Estimate
An example of the C code on the RTP timestamp estimate is listed below for reference.
```
#define MAX_TS_DIFF      80000   /* 10s max timestamp change */
#define MAX_FRAME_DIFF   1000    /* 1000 max frames */
INT32 TimeStampDiff(UINT32 ref, UINT32 value)
{
    INT32 tsDelta;
    if(value >= ref)
        tsDelta = value - ref;
    else if(((ref + MAX_TS_DIFF) & 0xFFFFFFFF) < value)
        tsDelta = value - ref;
    else
        tsDelta = (INT32)((unsigned long long)0x100000000 - ref + value);
    if (tsDelta > MAX_TS_DIFF)
        tsDelta = MAX_TS_DIFF;
```

APPENDIX-continued

```
    else if (tsDelta + MAX_TS_DIFF < 0)
        tsDelta = (INT32) −MAX_TS_DIFF;
    else
        ;
    return tsDelta;
}
c. Example of Header file
typedef unsigned short  UINT16;
typedef short  INT16;
typedef int  INT32;              /* INT32 is 32-bit */
typedef unsigned int  UINT32;    /* UINT32 is 32-bit */
typedef enum
{
        STATE_BAD,
        STATE_GOOD,
        STATE_RESYNCH,
        STATE_ROGUE
}RTP_PKT_STATES;
typedef struct
{
        UINT16 version:2;        /* protocol version */
        UINT16 p:1;              /* padding flag */
        UINT16 x:1;              /* header extension flag */
        UINT16 cc:4;             /* CSRC count */
        UINT16 m:1;              /* marker bit */
        UINT16 pt:7;             /* payload type */
        UINT16 seq;              /* sequence number */
        UINT16 tsHigh;           /* timestamp MSB */
        UINT16 tsLow;            /* timestamp LSB */
        UINT16 ssrcHigh;         /* synchronization source MSB */
        UINT16 ssrcLow;          /* synchronization source LSB */
        UINT16 csrcHigh[1];      /* optional CSRC list */
        UINT16 csrcLow[1];       /* optional CSRC list */
} RTP_HEADER;
typedef struct _RTP_SRC_STATE
{
    UINT32 ssrc;
    UINT32 cycles;               /* shifted count of seq. number cycles */
    UINT32 baseSeq;              /* base seq number */
    UINT32 badSeq;               /* last 'bad' seq number + 1 */
    UINT32 received;             /* packets received with the same SSRC */
    UINT32 expectedPrior;        /* packet expected at last interval */
    UINT32 receivedPrior;        /* packet received at last interval */
    INT32 transit;               /* relative trans time for prev pkt */
    UINT32 lost;                 /* cumulative number of packets lost */
    UINT32 jitter;               /* estimated jitter */
    UINT32 outputSeq;            /* seq number of outgoing packet */
    UINT32 outputTimestamp;      /* time stamp of outgoing packet */
    UINT32 packetsReceived;      /* total number of packets received */
    UINT32 packetsSent;          /* number of packets sent */
    UINT32 bytesSent;            /* number of bytes sent */
    INT32 ssrcHP;                /* ssrc jump */
    INT32 seqHP;                 /* seq number jump */
    UINT32 maxTS;                /* TS value corresponding to maxSeq */
    UINT16 prevEncodedFrames;        /* previous encoded frames counter */
    UINT32 rfc2833Rxed;          /* Number of RFC 2833 packets received */
    UINT32 rfc2833Txed;          /* Number of RFC 2833 packets transmitted */
    INT32 rtp_sidmis_disc;       /* #discarded due to source port mismatch */
    INT32 rtcp_sidmis_disc;      /* #discarded RTCP, source port mismatch */
    UINT16 maxSeq;               /* highest seq. number seen */
    UINT16 probation;            /* sequ. packets till source is valid */
    UINT16 fractionLost;         /* fraction lost */
    UINT16 packetsDiscarded;     /* number of packets discarded */
    UINT16 rtcpReceived;         /* number of RTCP packets received */
    UINT16 rtcpSent;             /* number of RTCP packets sent */
    UINT16 udpParams[2];         /* UDP TOS and TTL */
    UINT16 rtpSourcePort;        /* RTP source port */
    UINT16 rtcpSourcePort;       /* RTCP source port */
    UINT16 rtpResynchCnt;        /* Resynch counter */
    BOOL byeReceived;            /* RTCP BYE packet received flag */
    BOOL codecLocked;            /* codec locked flag */
} RTP_SRC_STATE, *RTP_SRC_STATE_PTR;
```

What is claimed is:

1. A computer-implemented method for handling rogue data packets comprising:
   receiving, by a network using one or more processors, a first data packet having header information associated therewith;
   obtaining, from the header information, sequence number, timestamp, contributing source identifier information, contributing source identifier count information and synchronization source identifier information, wherein the contributing source identifier information identifies contributing sources for payload contained in the first data packet;
   detecting whether the first data packet is a rogue data packet, based upon, at least in part, a resynchronization counter of data packets, a threshold difference between a timestamp of the first data packet and a timestamp of a previous data packet, and at least one of the sequence number, and synchronization source identifier information; and
   defining, using a finite state machine, a state of the first data packet as one of STATE RESYNCH and STATE ROGUE, wherein the state is referenced by a pointer.

2. The method of claim 1, further comprising:
   determining a change in the synchronization source identifier information based upon, at least in part, the resynchronization counter of data packets.

3. The method of claim 1, further comprising:
   determining a change in the sequence number based upon, at least in part, the resynchronization counter of data packets.

4. The method of claim 1, wherein the first data packet is a real-time transport protocol ("RTP") data packet.

5. The method of claim 1, wherein detecting is based upon, at least in part, adaptive timing resynchronization.

6. The method of claim 1, wherein the first data packet is transmitted during a Voice over Internet Protocol ("VoIP") communication system.

7. A non-transitory computer-readable storage medium having stored thereon instructions, which when executed by a processor result in one or more operations for handling rogue data packets, the operations comprising:
   receiving, by a network using one or more processors, a first data packet having header information associated therewith;
   obtaining, from the header information, sequence number, timestamp, contributing source identifier information, contributing source identifier count information and synchronization source identifier information, wherein the contributing source identifier information identifies contributing sources for payload contained in the first data packet;
   detecting whether the first data packet is a rogue data packet, based upon, at least in part, a resynchronization counter of data packets, a threshold difference between a timestamp of the first data packet and a timestamp of a previous data packet, and at least one of the sequence number, and synchronization source identifier information; and
   defining, using a finite state machine, a state of the first data packet as one of STATE RESYNCH and STATE ROGUE, wherein the state is referenced by a pointer.

8. The computer-readable storage medium of claim 7, wherein operations further comprise:
   determining a change in the synchronization source identifier information based upon, at least in part, the resynchronization counter of data packets.

9. The computer-readable storage medium of claim 7, wherein operations further comprise:
   determining a change in the sequence number based upon, at least in part, the resynchronization counter of data packets.

10. The computer-readable storage medium of claim 7, wherein the first data packet is a real-time transport protocol ("RTP") data packet.

11. The computer-readable storage medium of claim 7, wherein detecting is based upon, at least in part, adaptive timing resynchronization.

12. The computer-readable storage medium of claim 7, wherein the first data packet is transmitted during a Voice over Internet Protocol ("VoIP") communication system.

13. A system for handling rogue data packets comprising:
    one or more processors configured to receive over a network a first data packet having header information associated therewith, the one or more processors further configured to obtain, from the header information, sequence number, timestamp, contributing source identifier information, contributing source identifier count information and synchronization source identifier information, wherein the contributing source identifier information identifies contributing sources for payload contained in the first data packet, the one or more processors further configured to detect whether the first data packet is a rogue data packet, based upon, at least in part, a resynchronization counter of data packets, a threshold difference between a timestamp of the first data packet and a timestamp of a previous data packet, and at least one of the sequence number, and synchronization source identifier information, the one or more processors further configures to define, using a finite state machine, a state of the first data packet as one of STATE RESYNCH and STATE ROGUE, wherein the state is referenced by a pointer.

14. The system of claim 13, wherein the one or more processors are further configured to determine a change in the synchronization source identifier information based upon, at least in part, the resynchronization counter of data packets.

15. The system of claim 13, wherein the one or more processors are further configured to determine a change in the sequence number based upon, at least in part, the resynchronization counter of data packets.

16. The system of claim 13, wherein the first data packet is a real-time transport protocol ("RTP") data packet.

17. The system of claim 13, wherein detecting is based upon, at least in part, adaptive timing resynchronization.

* * * * *